J. S. DILTZ.
Dry Amalgamator.
No. 41,763.             Patented Mar. 1, 1864.
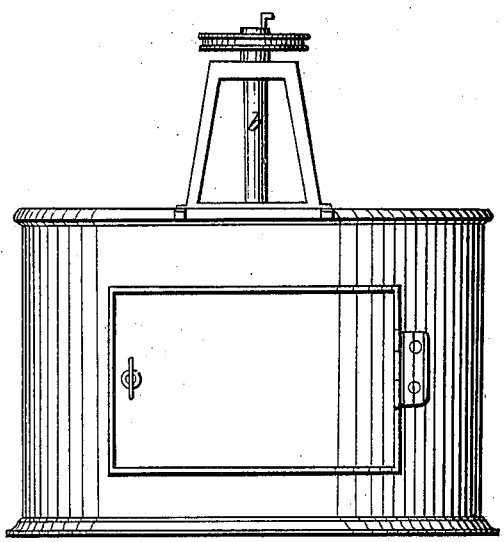
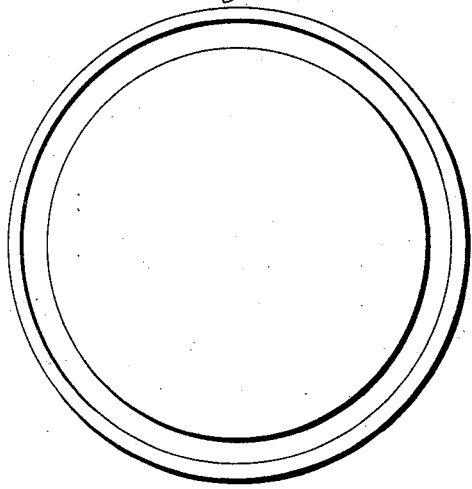
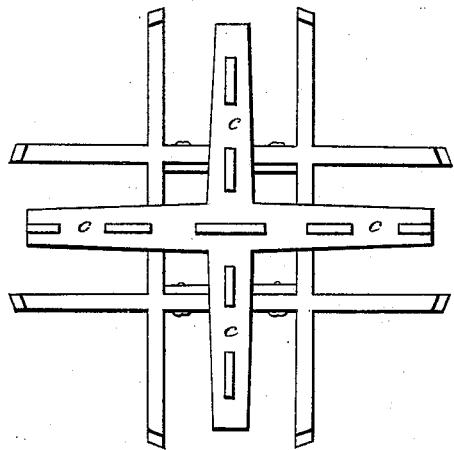
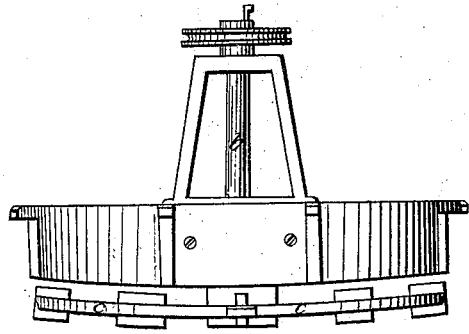
Witnesses:
Inventor:

UNITED STATES PATENT OFFICE.

JOHN S. DILTZ, OF MOUNT OPHIR, CALIFORNIA.

IMPROVEMENT IN APPARATUS FOR AMALGAMATING GOLD AND SILVER.

Specification forming part of Letters Patent No. 41,763, dated March 1, 1864.

*To all whom it may concern:*

Be it known that I, JOHN S. DILTZ, of Mount Ophir, county of Mariposa, and State of California, have invented a new and Improved Amalgamating Pan and Boiler for Amalgamating Gold and Silver Ores; and I do hereby declare the following is a full, clear, and exact description of the construction and operation of the same, reference being had to the annexed drawings, making a part of this specification.

The nature of my invention consists in providing an amalgamating process for extracting the precious metals from sulphureted and arseniureted ores, and from refuse or tailings left by mills that have worked the ore once.

By this process I save a large amount of the precious metal from waste ore, which heretofore has been considered of little value or of no value at all.

To enable others skilled in the art to make and use my invention, I will proceed to describe its construction and operation.

The pan must be made of copper, in order that it may be galvanized with quicksilver. The furnace can be made of brick or iron. The ore must be finely powdered or pulverized and then placed where it can be spread out, and is wet with salt brine and exposed to the air for three days. It is then placed into the amalgamating pan. Quicksilver and lime or strong lye is added; also, more salt and water, to the strength of sea-water. Fire is now placed under the boiler, the muller is started, and the whole mass is boiled for about three hours, when the salt water is drawn off by means of a cock and saved for another preparation, and fresh water is now let into the pan, which washes the sand and débris away, and the amalgamation is completed.

In the drawings, Figure 1 is the front elevation of the amalgamator and boiler. A is the furnace. *b* is the muller-shaft. Fig. 2 represents the copper pan. Fig. 3 is the muller-head. *c c c c* are the stirrers or crossbars. Fig. 4 represents the muller in detail, as it rests in the copper pan upon the furnace.

What I claim as my invention, and desire to secure by Letters Patent, is—

The rotary muller, together with the copper pan, as applied to this boiling process.

J. S. DILTZ.

Witnesses:
   C. W. M. SMITH,
   THOS. FANNATT.